(12) United States Patent
Park et al.

(10) Patent No.: US 11,434,995 B2
(45) Date of Patent: Sep. 6, 2022

(54) APPARATUS AND METHOD FOR CONTROLLING TRANSMISSION OF VEHICLE

(71) Applicants: Hyundai Motor Company, Seoul (KR); Kia Motors Corporation, Seoul (KR)

(72) Inventors: Kwang Hee Park, Suwon-si (KR); Sang Jun Park, Seoul (KR); Seung Jun Shin, Yongin-si (KR); Byeong Wook Jeon, Seoul (KR); Jae Chang Kook, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 532 days.

(21) Appl. No.: 16/555,720

(22) Filed: Aug. 29, 2019

(65) Prior Publication Data
US 2020/0256464 A1    Aug. 13, 2020

(30) Foreign Application Priority Data
Feb. 12, 2019 (KR) .................. 10-2019-0016098

(51) Int. Cl.
*F16H 61/662* (2006.01)
*F16H 61/00* (2006.01)
(Continued)

(52) U.S. Cl.
CPC ..... *F16H 61/66272* (2013.01); *B60W 30/181* (2013.01); *F16H 61/0021* (2013.01); *G01C 21/3697* (2013.01); *F16H 2059/666* (2013.01); *F16H 2061/661* (2013.01); *F16H 2061/66281* (2013.01)

(58) Field of Classification Search
CPC ......... F16H 2059/666; F16H 61/66272; F16H 61/0021; F16H 2061/66281; G01C 21/3697
See application file for complete search history.

(56) References Cited

U.S. PATENT DOCUMENTS 4,936,095 A * 6/1990 Ross ................. F16H 39/14
60/487
10,316,967 B2 6/2019 Abe et al.
(Continued)

FOREIGN PATENT DOCUMENTS

| JP | 4258091 B2 | 4/2009 |
|---|---|---|
| JP | 5733249 B2 | 6/2015 |
| JP | 6340135 B2 | 6/2018 |

*Primary Examiner* — Edwin A Young
(74) *Attorney, Agent, or Firm* — Morgan, Lewis & Bockius LLP

(57) ABSTRACT

An apparatus for controlling a transmission of a vehicle includes a processor configured to identify a location of a speed bump based on collected information about a specified section of a front road and determine whether the vehicle enters a section of the speed bump, and to set an oil pressure of the transmission to a first oil pressure in a normal driving section and set the oil pressure of the transmission to a second oil pressure when the vehicle enters the section of the speed bump, and a controller that controls the oil pressure of the transmission corresponding to a setting of the processor for each driving section of the vehicle.

20 Claims, 7 Drawing Sheets

(51) Int. Cl.
  G01C 21/36 (2006.01)
  B60W 30/18 (2012.01)
  *F16H 61/66* (2006.01)
  *F16H 59/66* (2006.01)

(56) References Cited

U.S. PATENT DOCUMENTS

2018/0119813 A1    5/2018  Abe et al.
2018/0319237 A1*  11/2018  Unger ................ B60G 17/0165

* cited by examiner

APPARATUS AND METHOD FOR CONTROLLING TRANSMISSION OF VEHICLE

CROSS-REFERENCE TO RELATED APPLICATION

This application claims the benefit of priority to Korean Patent Application No. 10-2019-0016098, filed on Feb. 12, 2019 in the Korean Intellectual Property Office, the entire contents of which are incorporated herein by reference.

TECHNICAL FIELD

The present disclosure relates to an apparatus for controlling a transmission of a vehicle, and a method thereof.

BACKGROUND

A continuously variable transmission (CVT) is a shiftless transmission capable of adjusting various gear ratios within a certain range without changing a gear position.

A continuously variable transmission (CVT) may be classified into a belt driving scheme for transmitting power through a belt provided between two pulleys and a friction scheme including two friction plates and a roller for transmitting power between the two friction plates.

In the belt driving scheme, the diameter of the pulley is changed in the process of transmitting power such that the gear ratio is formed by the pulley ratio of the driven shaft and the driving shaft, and the oil pressure is applied to the belt connected to the pulleys corresponding to an input torque (in the shift direction) to prevent the belt from slipping.

According to the related art, in a situation where a large reverse driving force is transmitted to the driving shaft due to an external road situation such as a speed bump, when the oil pressure is controlled in the continuously variable transmission (CVT), the oil pressure applied to a belt may be insufficient, so that belt slippage occurs, thereby damaging the CVT. In order to solve such a problem, the oil pressure may be continuously maintained at a high level even in the normal driving section, but in this case, the fuel efficiency may be lowered.

SUMMARY

The present disclosure has been made to solve the above-mentioned problems occurring in the prior art while advantages achieved by the prior art are maintained intact.

An aspect of the present disclosure provides an apparatus and a method for controlling a transmission of a vehicle, which are capable of identifying the location of a speed bump in advance, preventing a belt from slipping by raising the oil pressure when the vehicle enters a speed bump section, and keeping the oil pressure of the transmission at the minimum in other general driving sections, thereby further improving the fuel efficiency.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a transmission of a vehicle may include a processor configured to identify a location of a speed bump based on collected information about a specified section of a front road and determine whether the vehicle enters a section of the speed bump, to set an oil pressure of the transmission to a first oil pressure in a normal driving section and set the oil pressure of the transmission upward to a second oil pressure when the vehicle enters the section of the speed bump, and a controller configured to control the oil pressure of the transmission corresponding to a setting of the processor for each driving section of the vehicle.

The processor may be further configured to determine an increase amount of the oil pressure of the transmission corresponding to a deceleration of the vehicle when the vehicle enters the section of the speed bump.

The controller may input a second torque value to control the oil pressure of the transmission, where the second torque value is obtained by adding a torque value corresponding to the increase amount of the oil pressure to a first torque value input to the transmission.

The processor may determine the increase amount of the oil pressure within a range in which the second torque value exceeds the first torque value and is less than a maximum torque value.

The controller may control the oil pressure of the transmission to linearly return to the first oil pressure when the vehicle passes through the section of the speed bump.

The processor may be further configured to collect information about a speed bump located in the specified section of the front road.

The processor may collect the information about the speed bump of the front road from a navigation.

The processor may collect the information about the speed bump of the front road from a sensor.

The processor may collect information about a deceleration of the vehicle when the vehicle enters a speed bump section.

The section of the speed bump may include a section ranging from locations forwardly spaced and backwardly spaced from a location of the speed bump by a specified distance.

The transmission may include a continuously variable transmission.

According to another aspect of the present disclosure, a method of controlling a transmission of a vehicle includes steps of identifying a location of a speed bump based on collected information about a specified section of a front road and determining whether the vehicle enters a section of the speed bump, setting an oil pressure of the transmission to a first oil pressure in a normal driving section and setting the oil pressure of the transmission to a second oil pressure when the vehicle enters the section of the speed bump, and controlling the oil pressure of the transmission corresponding to the setting for each driving section of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
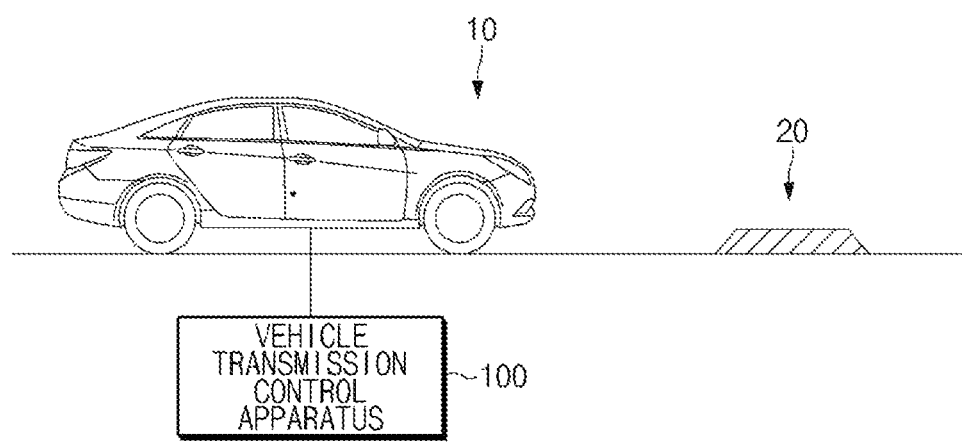
FIG. 1 is a view illustrating a vehicle to which an apparatus for controlling a transmission of a vehicle according to an exemplary embodiment of the present disclosure is applied.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a vehicle to which an apparatus for controlling a transmission of a vehicle according to an exemplary embodiment of the present disclosure is applied.

Referring to FIG. 1, a transmission control apparatus 100 for a vehicle controls a gear ratio to transmit power to the transmission. As an example, the transmission may be a continuously variable transmission (CVT) in which a driven shaft and the driving shaft are connected to each other through a belt.

In this case, the CVT, which is a transmission that continuously controls the gear ratio, may automatically control the gear ratio at high power transmission efficiency without any shift shocks during driving to improve the fuel efficiency and maintain the optimum driving state. As the CVT, there are a belt drive type CVT in which a belt and a pulley are used, and a traction drive type CVT in which power is transmitted by contact between rolling bodies.

In the belt drive type CVT, the radii of the pulleys of the driven and driving shafts of the transmission are changed through hydraulic control, so that the pressing force on the belt connecting the pulleys of the driven and driving shafts may be controlled.

The transmission control apparatus 100 according to an embodiment of the present disclosure controls an oil pressure of a pulley in a process of transmitting power to the transmission to change the diameter, thereby forming the gear ratio by the pulley ratio between the driven shaft and the driving shaft.

In addition, the transmission control apparatus 100 controls the oil pressure for each input torque to prevent the belt connected to the pulleys from slipping.

In this case, the transmission control apparatus 100 grasps the condition of the front road in advance to prevent the belt from slippage in a state where a large reverse driving force is transmitted to the driving shaft, and variably controls the oil pressure based on to the grasped condition of the front road.

In this case, the transmission control apparatus 100 may obtain information about the front road from a navigation. The navigation may extract road information of a specified section of the front road from the current location of a vehicle 10, for example, location information of a speed bump 20 in response to a request from the transmission control apparatus 100, and provide the location information to the transmission control apparatus 100.

Meanwhile, the transmission control apparatus 100 may obtain the location information of the speed bump 20 on the front road through a sensor of the vehicle 10.

When the location of the speed bump 20 on the front road is identified from the navigation and/or the sensor, the transmission control apparatus 100 variably controls the oil pressure while the vehicle enters a previously specified section from the speed bump 20, that is, the speed bump section such that the bolt is prevented from slipping and restores the oil pressure when the vehicle is out of the speed bump section, thereby effectively controlling the fuel consumption.

Thus, the details of the transmission control apparatus 100 of the vehicle 10 will be described with reference to the embodiment of FIG. 2.

The transmission control apparatus 100 according to an exemplary embodiment of the present disclosure may be implemented inside the vehicle 10. In this case, the transmission control apparatus 100 may be formed integrally with the internal controllers of the vehicle 10. Meanwhile, the transmission control apparatus 100 may be implemented as a separate device and may be connected to the controllers of the vehicle 10 by separate connecting means.

Figure 2:
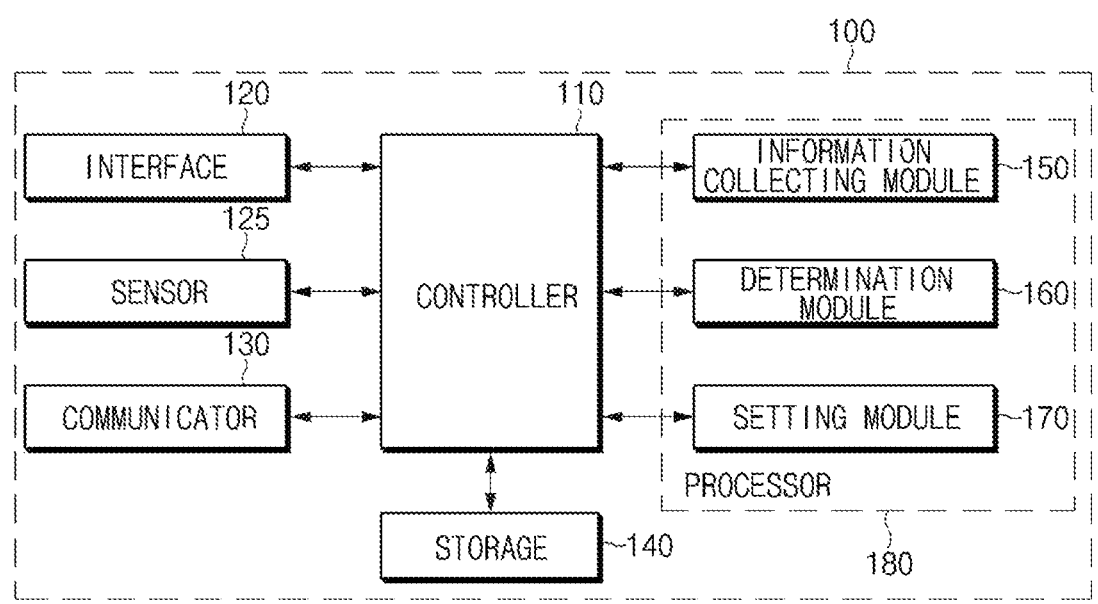
FIG. 2 is a block diagram illustrating a configuration of a transmission control apparatus for a vehicle according to an exemplary embodiment of the present disclosure.

FIG. 2 is a block diagram illustrating a configuration of a transmission control apparatus for a vehicle according to an exemplary embodiment of the present disclosure.

Referring to FIG. 2, the transmission control apparatus 100 for a vehicle may further include a controller 110, an interface 120, a sensor(s) 125, a communicator 130, storage 140, and at least one processor 180 (e.g., computer, microprocessor, CPU, ASIC, circuitry, logic circuits etc.). The processor 180 may include an associated non-transitory memory storing software instructions which, when executed by the processor 180, provides the functionalities of an information collecting module 150, a determination module 160, and a setting module 170. In this case, the controller 110 may process signals communicated between the processor 180 and the interface 120, sensor(s) 125, communicator 130, and the storage 140. The processor 180 may take the form of one or more processor(s) and associated memory storing program instructions, and in some examples the one or more processor(s) may be used to implement the functions of both the controller 110 and the processor 180. Herein, the memory and the processor 180 may be implemented as separate semiconductor circuits. Alternatively, the memory and the processor 180 may be implemented as a single integrated semiconductor circuit.

The interface 120 may include input means for receiving a control command from a user and output means for outputting an operation state and a result of the transmission control apparatus 100.

In this case, the input means of the interface 120 may include a key button, and may include a mouse, a joystick, a jog shuttle, a stylus pen, and the like. Further, the input means may include a soft key implemented on the display.

The output means of the interface 120 may include a display and may include voice output means such as a speaker. In this case, when a touch sensor such as a touch film, a touch sheet, a touch pad, or the like is provided on the display, the display operates as a touch screen, and the input means and the output means may be formed in an integrated form.

As an example, the display may display the information about the front road and may display information about transmission control determined by the transmission control apparatus 100.

In this case, the display may include at least one of a liquid crystal display (LCD), a thin film transistor liquid crystal display (TFT LCD), an organic light-emitting diode (OLED), a flexible display, a field emission display (FED), or a three-dimensional (3D) display.

The sensor 125 may include one or more sensors for detecting obstacles located around the vehicle 10 and for detecting information about the obstacles. For example, the sensor 125 may include a lidar, a camera, and the like for detecting information about the speed bump 20 on the front road, or any sensor capable of detecting information about an obstacle such as the speed bump 20.

The sensor 125 may further include a sensor for measuring the travelling data such as a speed, an acceleration, a deceleration of the vehicle 10, and the like.

The communicator 130 may be a hardware device implemented by various electronic circuits, e.g., a processor, to transmit and receive signals via wireless or wired connections. The communicator 130 may include a communication module that supports a communication interface with electrical components and/or controllers provided in the vehicle 10. As an example, the communication module may be communicatively connected to the navigation provided on the vehicle 10 to receive the information about the front road from the navigation. In addition, the communication module may receive the driving data (e.g., a speed, an acceleration, APS, and the like) of the vehicle 10 from the controllers provided in the vehicle 10. When the driving data of the vehicle 10 is received through the communication module, the configuration of the sensor 125 for measuring the driving data may be omitted.

In this case, the communication module of the communicator 130 may include a module that supports vehicle network communication such as controller area network (CAN) communication, local interconnect network (LN) communication, flex-ray communication, and the like.

In addition, the communicator 130 may further include a communication module supporting wireless Internet access and/or a communication module supporting short range communication. In this case, wireless Internet technology may include wireless LAN (WLAN), wireless broadband (WIBRO), Wi-Fi, world interoperability for microwave access (WiMAX), and the short range communication technology may include Bluetooth, ZigBee, ultra-wideband (UWB), radio frequency identification (RFID), infrared data association (IrDA), and the like.

The storage 140 may store data, algorithms, and the like required for the operation of the transmission control apparatus 100.

As an example, the storage 140 may store information about the front road, for example, location information of the speed bump 20, information about the speed bump section, and the like. In addition, the storage 140 may store the driving data of the vehicle 10.

In addition, the storage 140 may store a condition, a command, an algorithm, and the like for variably controlling the oil pressure of the transmission. As an example, the storage 140 may store belt pulley slip protection logic.

In this case, the storage 140 may include a storage medium such as a random access memory (RAM), a static random access memory (SRAM), a read-only memory (ROM), a programmable read-only memory (PROM), an electrically erasable programmable read-only memory (EEPROM), and the like.

The controller 110 determines the pulley ratio of the driven and driving shafts and controls the diameter of the pulley to form the gear ratio of the transmission.

In addition, the controller 110 controls the oil pressure applied to the belt connected to the driven and driving shafts corresponding to the input torque. The controller 110 controls the oil pressure to a first oil pressure set as a reference value (default) in a normal travelling section. Meanwhile, the controller 110 controls the oil pressure to a second oil pressure which is controlled corresponding to deceleration corresponding to a situation of the front road when the vehicle enters the speed bump section.

Thus, the controller 110 allows the information collecting module 150 of the processor 180 to collect the information about the front road during travelling in order to grasp the situation of the front road.

The information collecting module 150 of the processor 180 may collect the information about the front road during travelling of the vehicle 10. For example, the information collecting module 150 may collect the information about the speed bump 20 located in a specified section on the front road based on the current location of the vehicle 10. In this case, the information collecting module 150 may collect the information about the front road in real time or in units of a certain time while the vehicle 10 is travelling.

In this case, the information collecting module 150 may collect the information about the front road from the navigation. In addition, the information collecting module 150 may collect the information about the front road from the sensors.

In addition, the information collecting module 150 may collect the driving information of the vehicle 10 such as a vehicle speed, a deceleration, and the like.

The information collecting module 150 may store the information about the front road collected from the navigation and/or the driving information of the vehicle 10 in the storage 140. In addition, the information collecting module 150 may transmit the collected information about the front road to the controller 110, the determination module 160, the setting module 170, and the like.

The determination module 160 of the processor 180 may determine whether the speed bump 20 exists on the front road based on the information about the front road collected by the information collecting module 150. When it is identified that the speed bump 20 exists on the front road, the controller 110 determines whether the vehicle 10 enters the speed bump section or has passed through the speed bump section.

In this case, the speed bump section refers to a range corresponding to a specified distance in forward and backward directions based on the center position of the speed bump 20.

When the vehicle 10 enters the speed bump section, the determination module 160 may output a first signal for guiding the entry state of the speed bump section to the controller 110 and/or the setting module 170. In addition, the determination module 160 may output a second signal for guiding the passing state of the speed bump section to the controller 110 and/or the setting module 170 when the vehicle 10 passes through the speed bump section.

The setting module 170 of the processor 180 may recognize the entry state of the speed bump section when the first signal is received from the determination module 160 while the vehicle 10 is traveling in a normal driving section. In this case, the setting module 170 increases the oil pressure to prevent the belt connected to the pulley from slipping.

In this case, the setting module 170 determines the increase amount of the oil pressure based on the deceleration of the vehicle 10 when the vehicle enters the speed bump section, and sets the oil pressure upward by the determined increase amount of the oil pressure.

The setting module 170 may set the belt pulley slip protection logic and execute the belt pulley slip protection logic to set the oil pressure upward based on the deceleration.

The controller 110 controls the oil pressure of the transmission upward corresponding to the oil pressure set upward by the setting module 170.

Furthermore, the setting module 170 recognizes the passing state of the speed bump section when the second signal is received from the determination module 160 in the state where the vehicle 10 enters the speed bump section. In this case, the setting module 170 resets the oil pressure set upward to a default value for the purpose of raising the fuel efficiency of the vehicle 10.

The controller 110 returns the oil pressure of the transmission to the default value corresponding to the oil pressure reset by the setting module 170. In this case, the controller 110 allows the oil pressure of the transmission to return gradually and linearly without returning at one time.

Figure 3:
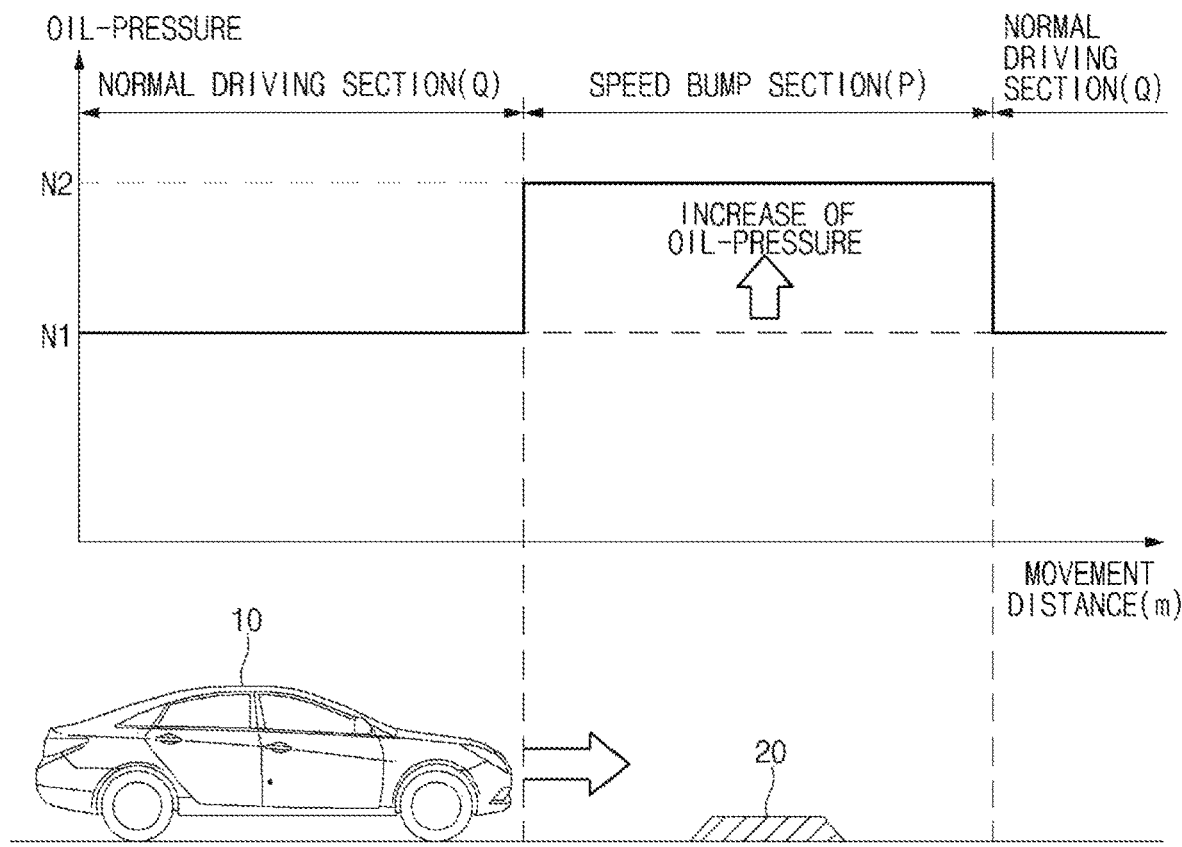
FIGS. 3, 4A and 4B are views illustrating an apparatus for controlling a transmission of a vehicle according to an exemplary embodiment of the present disclosure.

FIG. 3 is a view illustrating an exemplary embodiment of the present disclosure in which the oil pressure is variably set in the speed bump section. Referring to FIG. 3, the transmission control apparatus 100 sets the oil pressure to the first oil pressure, that is, N1 in the normal driving section Q. In this case, the first oil pressure may be set to a low value not to deteriorate the fuel efficiency of the vehicle 10, but may be set at such a degree that the belt can maintain the force coupling the driven and driving shafts.

Meanwhile, the transmission control apparatus 100 identifies the location of the speed bump 20 on the front road from the navigation, the sensor, or the like in advance, and sets the oil pressure upward to N2 to prevent the belt from slipping due to the reverse driving force while the vehicle 10 passes through the speed bump when the vehicle 10 enters the speed bump section P from the normal driving section Q. In this case, the N1 value is a default value, the N2 value is a value adjusted corresponding to the deceleration of the vehicle 10, and the N2 has a value larger than the N1. In this case, the N2 value may be set to a larger value as the deceleration of the vehicle 10 is increased within the range that does not exceed the maximum pressure. The transmission control apparatus 100 may raise the oil pressure to N2 before the vehicle 10 reaches the location of the speed bump 20 from the time when the vehicle 10 enters the speed bump section P.

When the vehicle 10 is driven while maintaining the oil pressure in a high state, the fuel efficiency of the vehicle 10 may be lowered. Thus, the transmission control apparatus 100 sets the oil pressure again to the default value N1 when the vehicle 10 passes through the speed bump section P and enters the normal driving section Q again.

In this case, it is possible to improve the fuel efficiency of the vehicle 10 by setting the oil pressure to be high only in the section in which the reverse driving force is generated by the speed bump 20 and setting the oil pressure to be low in the normal driving section Q.

Figure 4A:
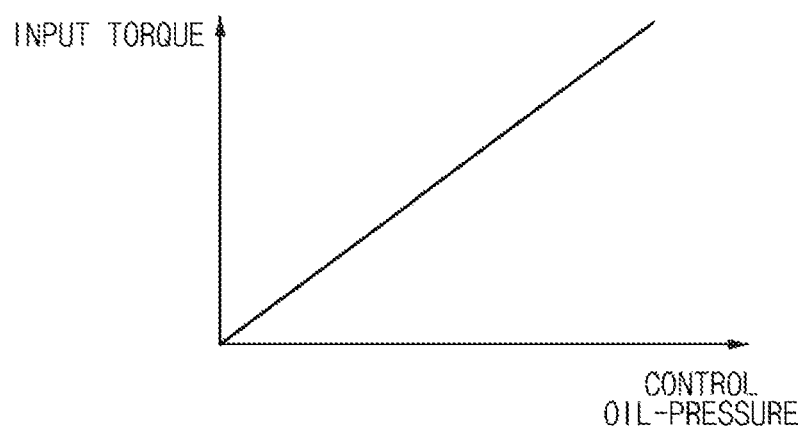
Figure 4B:
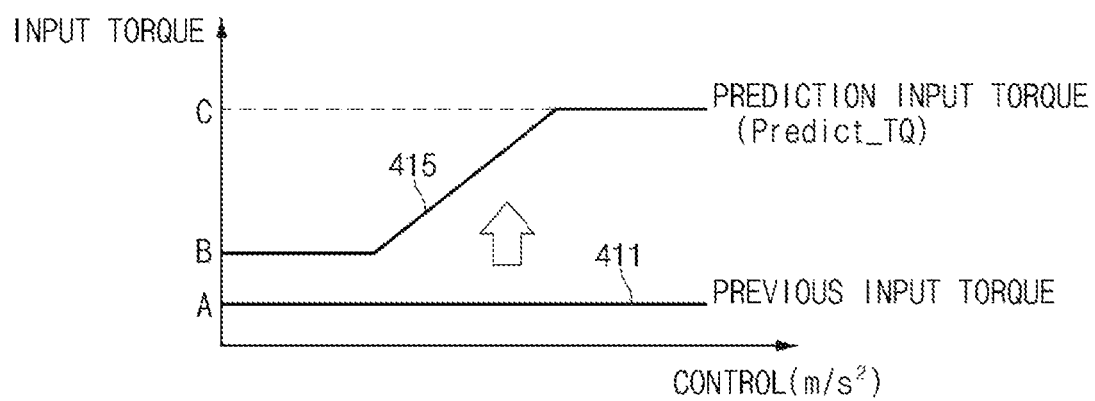

FIG. 4A is a graph illustrating the relationship between the control oil pressure and the input torque. FIG. 4B is a graph illustrating the relationship between the deceleration and the input torque.

As illustrated in the graph of FIG. 4A, the control oil pressure is set to be proportional to the input torque. Thus, the transmission control apparatus 100 sets the input torque upward by a certain amount to control the oil pressure upward.

Referring to FIG. 4B, the transmission control apparatus 100 sets the previous input torque (first torque) of reference numeral 411 to the input torque (second torque) of reference numeral 415.

In this case, the second torque value may be obtained by adding a torque value to the previous first torque value in consideration of a safety factor corresponding to the deceleration. The range of the torque added to the first torque value may be 150 Nm to 180 Nm, but the embodiment is not limited thereto. Further, the second torque value cannot exceed the allowable maximum torque value (Max TQ).

For example, when the deceleration is less than a specified value, the second torque value may be B=A+150 Nm. Meanwhile, when the deceleration exceeds the specified value, the second torque value may be C=A+180 Nm (C<Max TQ).

In this case, when the maximum torque value is applied to both the pulleys of the driven and driving shafts of the CVT, the gear ratio is formed to be 1:1, which is unsuitable to a situation of a low-speed state. Therefore, the transmission control apparatus 100 raises the oil pressure between the pulleys of the driven and driving shafts at a certain rate so that the gear ratio is not changed.

As described above, the transmission control apparatus 100 for a vehicle according to an exemplary embodiment of the present disclosure may be implemented in the form of an independent hardware device including a memory and a processor for processing each operation, and may be operated in the form included in another hardware device such as a microprocessor, or a general-purpose computer system.

The operation of the transmission control apparatus 100 for a vehicle according to an embodiment of the present disclosure configured as described above will be described in more detail as follows.

Figure 5:
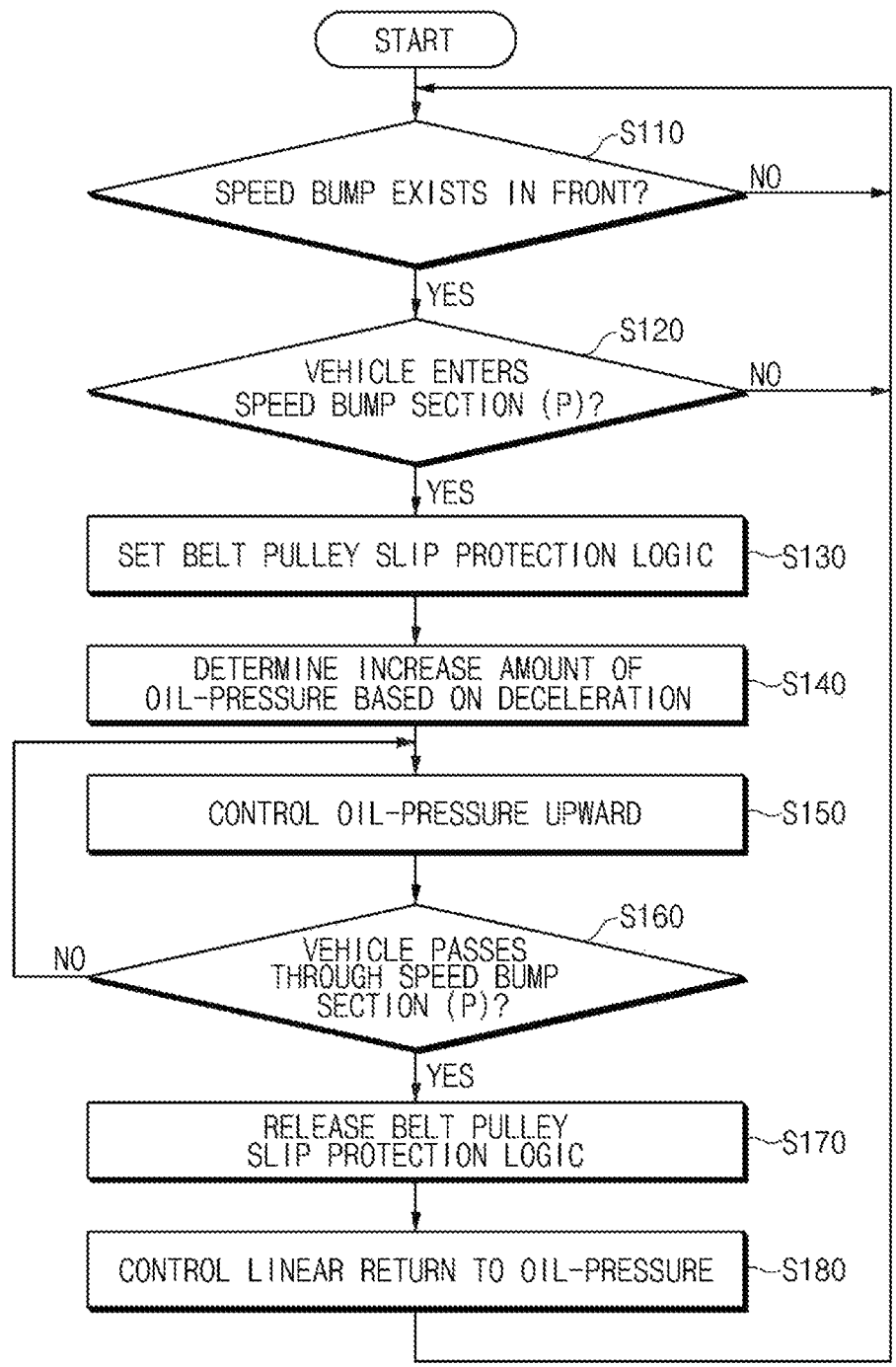
FIG. 5 is a diagram illustrating an operational flow for a shift control method of a vehicle according to an exemplary embodiment of the present disclosure.

FIG. 5 is a diagram illustrating an operational flow for a shift control method of a vehicle according to an exemplary embodiment of the present disclosure.

Referring to FIG. 5, the transmission control apparatus 100 for a vehicle collects the information about the front road during travelling in real time or every a period of time. In this case, in S110, it is determined whether the speed bump 20 exists on the front road based on the collected information.

When it is identified in S110 that the speed bump 20 exists on the front road, in S120, the transmission control apparatus 100 determines that the vehicle enters the speed bump section which corresponds to a specified distance in the forward and backward directions based on the central position of the speed bump 20.

In S130, when the vehicle 10 enters the speed bump section, the transmission control apparatus 100 sets the belt pulley slip protection logic to be executed. The transmission control apparatus 100 determines the increase amount of the oil pressure based on the deceleration of the vehicle 10 by executing the belt pulley slip protection logic in S140 and controls the oil pressure of the driven and driving shafts of the CVT upward corresponding to the determined increased amount of the oil pressure in S150.

The transmission control apparatus 100 maintains the upward controlled oil pressure within the speed bump section.

Meanwhile, when it is identified in S160 that the vehicle 10 passes through the speed bump section, the transmission control apparatus 100 releases the belt pulley slip protection logic in S170. Accordingly, in S180, the transmission control apparatus 100 controls the oil pressure upward adjusted in S160 to return to the previously set default value. In this case, the transmission control apparatus 100 does not return the oil pressure at a time but linearly and gradually returns the oil pressure.

Figure 6:
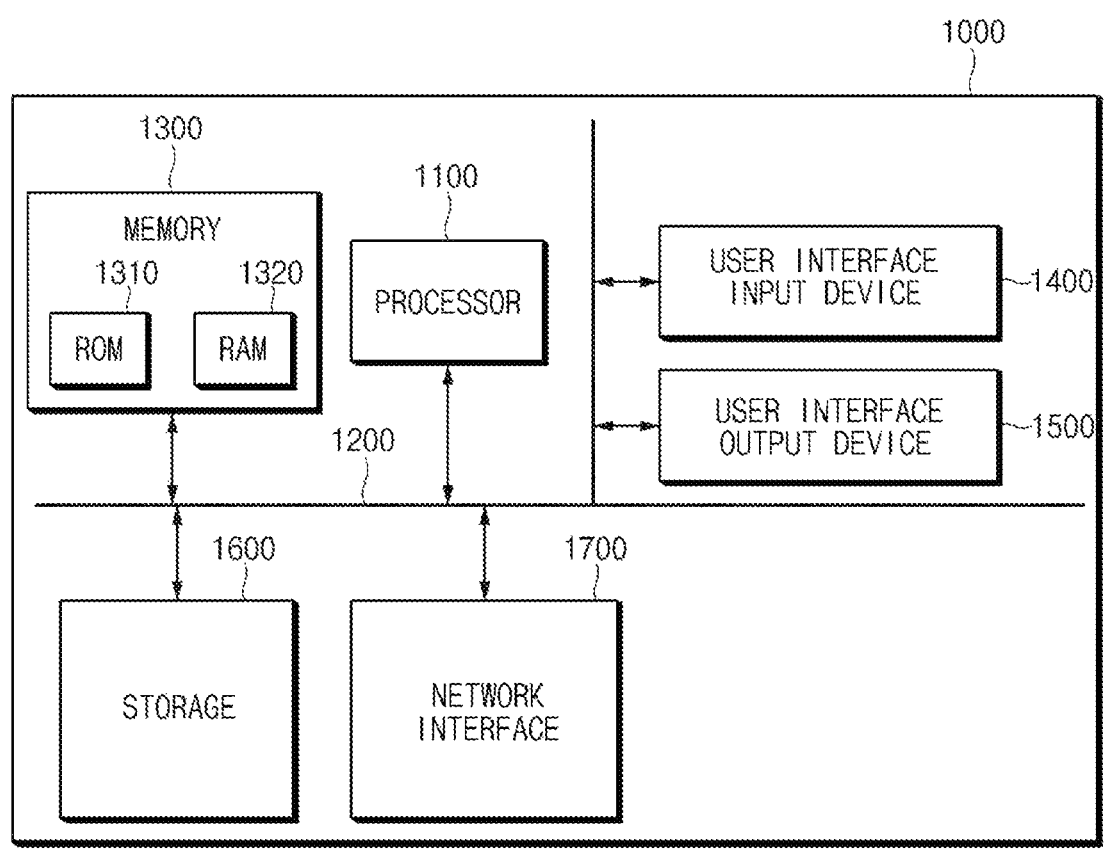
FIG. 6 is a view illustrating a computing system in which a method according to an exemplary embodiment of the present disclosure is executed.

FIG. 6 is a view illustrating a computing system in which a method according to an exemplary embodiment of the present disclosure is executed.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to exemplary embodiments of the present disclosure, it is possible to identify the location of a speed bump in advance, prevent a belt from slipping by raising the oil pressure when the vehicle enters a speed bump section, and keep the oil pressure of the transmission at the minimum in other general driving sections, thereby improving the fuel efficiency.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a transmission of a vehicle, the apparatus comprising:
a processor configured to:
identify a location of a speed bump based on collected information about a specified section of a front road and determine whether the vehicle enters a section of the speed bump, and
set an oil pressure of the transmission to a first oil pressure in a normal driving section and set the oil pressure of the transmission upward to a second oil pressure when the vehicle enters the section of the speed bump; and
a controller configured to control the oil pressure of the transmission corresponding to a setting of the processor for each driving section of the vehicle.

2. The apparatus of claim 1, wherein the processor is further configured to determine an increase amount of the oil pressure of the transmission corresponding to a deceleration of the vehicle when the vehicle enters the section of the speed bump.

3. The apparatus of claim 2, wherein
the controller is further configured to input a second torque value to control the oil pressure of the transmission, and wherein the second torque value is obtained by adding a torque value corresponding to the increase amount of the oil pressure to a first torque value input to the transmission.

4. The apparatus of claim 3, wherein the processor determines the increase amount of the oil pressure within a range in which the second torque value exceeds the first torque value and is less than a maximum torque value.

5. The apparatus of claim 1, wherein the controller is further configured to control the oil pressure of the transmission to linearly return to the first oil pressure when the vehicle passes through the section of the speed bump.

6. The apparatus of claim 1, wherein the processor is further configured to collect information about the speed bump located in the specified section of the front road.

7. The apparatus of claim 6, wherein the processor collects the information about the speed bump of the front road from a navigation.

8. The apparatus of claim 6, wherein the processor collects the information about the speed bump of the front road from a sensor.

9. The apparatus of claim 6, wherein the processor is further configured to collect information about a deceleration of the vehicle when the vehicle enters the speed bump section.

10. The apparatus of claim 6, wherein the section of the speed bump includes a section ranging from locations forwardly spaced and backwardly spaced from the location of the speed bump by a specified distance.

11. The apparatus of claim 1, wherein the transmission includes a continuously variable transmission.

12. A method of controlling a transmission of a vehicle, the method comprising steps of:
identifying a location of a speed bump based on collected information about a specified section of a front road and determining whether the vehicle enters a section of the speed bump;
setting an oil pressure of the transmission to a first oil pressure in a normal driving section and setting the oil pressure of the transmission to a second oil pressure when the vehicle enters the section of the speed bump; and
controlling the oil pressure of the transmission corresponding to a setting for each driving section of the vehicle.

13. The method of claim 12, wherein the step of setting the oil pressure includes determining an increase amount of the oil pressure of the transmission corresponding to a deceleration of the vehicle when the vehicle enters the section of the speed bump.

14. The method of claim 13, wherein the step of controlling the oil pressure includes inputting a second torque value to control the oil pressure of the transmission, and wherein the second torque value is obtained by adding a torque value corresponding to the increase amount of the oil pressure to a first torque value input to the transmission.

15. The method of claim 14, wherein the step of determining the increase amount of the oil pressure includes determining the increase amount of the oil pressure within a range in which the second torque value exceeds the first torque value and is less than a maximum torque value.

16. The method of claim 12, further comprising a step of:
controlling the oil pressure of the transmission to linearly return to the first oil pressure when the vehicle passes through the section of the speed bump.

17. The method of claim 12, further comprising a step of:
collecting information about the speed bump located in the specified section of the front road.

18. The method of claim 17, wherein the step of collecting information includes collecting the information about the speed bump of the front road from a navigation.

19. The method of claim 17, wherein the step of collecting information includes collecting the information about the speed bump of the front road from a sensor.

20. The method of claim 12, further comprising a step of:
collecting information about a deceleration of the vehicle when the vehicle enters the speed bump section.

* * * * *